Patented Oct. 16, 1951

2,571,867

UNITED STATES PATENT OFFICE

2,571,867

SPICE EXTRACTION AND PRODUCT

Lloyd A. Hall, Chicago, and Louis Sair, Evergreen Park, Ill., assignors to The Griffith Laboratories, Inc., Chicago, Ill., a corporation of Illinois Application July 21, 1950, Serial No. 175,114

9 Claims. (Cl. 99—140)

The present invention relates to the preparation of spice extracts and in particular to the fortification of essential oil of spice with non-volatile extracted ingredients deriving from the same kind of spice.

Natural spice contains volatile content commonly isolated by steam distillation as the essential oil of the spice. Natural spice has also non-volatile extractable ingredients in addition to the essential oil and these are lacking in the essential oil of commerce. The non-volatile ingredients vary widely in character and of course differ in the numerous spices. Among others there are ingredients of taste or flavor, of color, and of antioxidant properties.

The present invention aims to improve the "spice" properties of essential oil of spice by fortifying it with non-volatile spice ingredients.

It is the general object of the invention to fortify an essential oil of a spice by using it as a solvent for the extraction of spice values, and in particular of non-volatile spice values, from natural spice of the same origin.

It is a particular object of the invention to incorporate with essential oil antioxidant material native to the oil in the natural spice.

It is also an object of the invention to treat natural spice in a manner to provide numerous extracts of spice each including essential oil of spice enriched by non-volatile spice extracts.

Various other and ancillary objects and advantages of the invention will become apparent from the following description and explanation of the invention given in connection with the accompanying drawings, in which.

Inasmuch as the invention revolves about the action of essential oil of a spice as a solvent for spice values in the natural spice of its origin, it is obvious that the invention may be practiced in many ways, mechanically considered, to exercise the dissolving function, and in many variations of proportions and of conditions as to time and temperature, as will become apparent from the following illustrative procedures and examples.

Essential oil of a spice is conventionally derived by steam distillation of the ground natural spice, followed by separation of the resulting oil fraction. The essential oil is commonly a clear-light-colored liquid consisting when fresh of volatile ingredients of the natural spice. It has solvent power for non-volatile ingredients of the spice, such as the non-volatile spice resins commonly present with essential oil in the oleoresin of spice, as well as solvent action for coloring agents, such as chlorophyl, and other ingredients of special activity, such as phosphatides which function as antioxidants.

The present invention broadly contemplates subjection of natural spice to the extracting action of essential oil of the same spice for the resulting combination of non-volatile and volatile extracts of spice. Such an extraction provides solid residue with adhering liquid extract, which later may be recovered by any chosen washing procedure, followed or not by combination of the original extract and washings in chosen but arbitrary proportions. Where such combination is effected, it is preferred to use as the washing solvent an edible material which may be unobjectionable in the combination. Since spice extracts are commonly standardized or stabilized by a variable fraction of edible oil or fat, and further, since spice extracts are extensively used in seasoning fat-containing foods, such as meat products, the preferred solvent is edible oil or fat, hereinafter referred to as oleaginous solvent.

Figure 1:
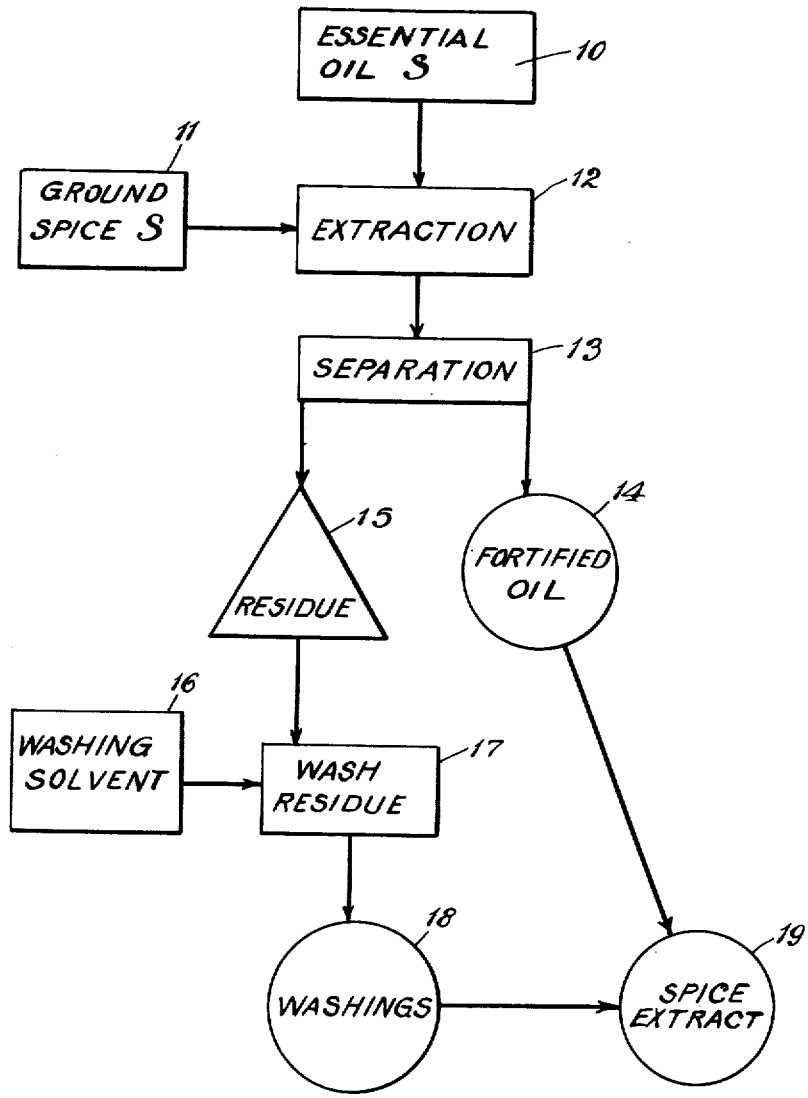
Fig. 1 is a flow chart of the generic processing of the present invention showing the extraction of natural spice with essential oil of that spice as a solvent, and showing recovery and use of extracted material.

The process in its principal steps is indicated in Fig. 1. Numeral 10 represents a supply of essential oil of spice S, and numeral 11 represents a supply of natural spice S in a suitable comminuted form to be subjected to the extracting action of essential oil 10. Because of the ease of oxidation and of the volatility of essential oil 10, it is preferred to carry out the extraction in a closed container where an elevated temperature is used, and also preferred to use an elevated temperature to expedite the process and improve its efficiency. Numeral 12 represents an extraction, preferably carried out as a batch infusion for any desired period of time at any chosen temperature, and in variable proportions of spice 11 and oil 10, with variance in the results according to the conditions imposed.

After a substantial extent or completion of the extraction, there is a separation indicated at 13 of the liquid and solids, providing a fortified essential oil 14 which is now more colored than essential oil 10, and a fibrous residue 15 containing residual liquid 14 subject to recovery by washing with a solvent.

Numeral 16 represents a supply of suitable washing solvent which from practical and economic points of view is edible in the event that it is not to be removed by distillation from the spice ingredients in the washings. And again, from the same points of view, the solvent is preferably one which is not to be distilled away in order to avoid loss of volatile essential oil in such a distillation. The preferred solvent is one which may be used hot to enhance its solvent power in the washing operation. An edible oleaginous solvent such as a vegetable oil, lard, or hydrogenated oil, which is fluid at the washing temperature, is preferred.

Numeral 17 represents the step of washing the extracted residue 15 with solvent 16 to provide washings 18. Various signs will be found to indicate the practical completion of the washing step which is most economically carried out by using the washing solvent in several increments of washing, each followed by separation from the residue being washed. Sometimes the color of the extract is an acceptable sign. Under fixed conditions of operation, after standardizing the procedure by suitable analysis, the amount of washing solvent used may readily become an effective empirical sign.

The washings 18 may be combined in any proportion with the fortified oil 14 to make a new mixture 19 which in effect is a diluted spice extract as a result of its content of washing solvent 16. Where the washing solvent 16 is edible and suitable as an ingredient of a food product to be seasoned with the spice values associated therewith, the dilution of the spice extract by the solvent is not material.

Figure 2:
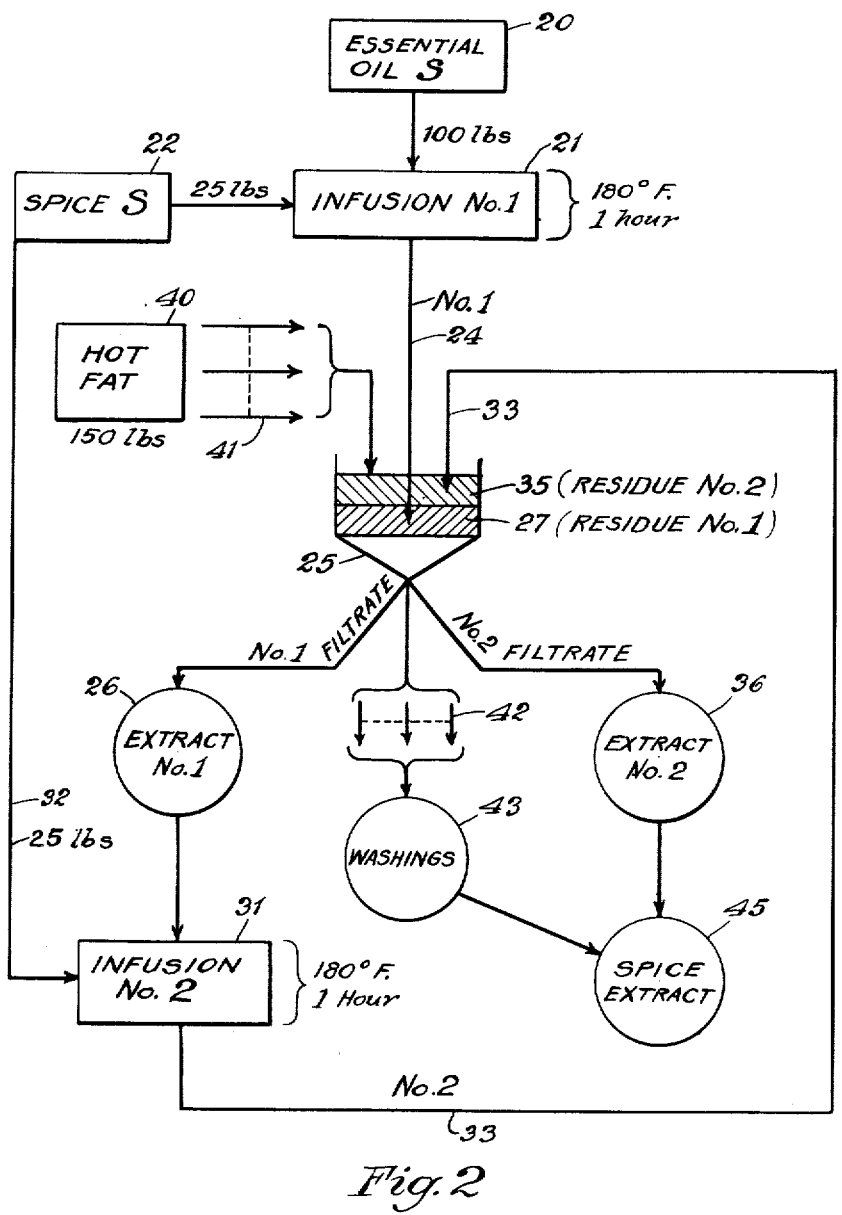
Fig. 2 is a more detailed flow chart of one manner of carrying out the generic process of Fig. 1 indicating certain of the mechanical manipulations involved.

Fig. 2 is a representation of an exemplary procedure applicable to a wide variety of spices as indicated below. In Fig. 2 numeral 20 designates a supply of essential oil of spice S and for the sake of being specific, the quantity is indicated as 100 pounds. The oil 20 is placed in a container which may be sealed and heated for practicing an infusion indicated at 21. Numeral 22 indicates a supply of ground spice S of which 25 pounds is indicated by the numeral 23 as employed in the infusion 21. The infusion mass is then heated preferably with agitation for approximately one hour at 180° F., the time and temperature being arbitrary, but specified in order to correlate the steps with the results hereinafter given. The final infusion mass is referred to by the numeral 24 as No. 1 and this subjected to filtration in a filter indicated at 25, which provides filtrate or extract No. 1 indicated by numeral 26 and a filter cake 27 shown lowermost in the filter 25.

Then the filtrate No. 1 is employed as solvent in a second and similar extraction or infusion No. 2 designated by the numeral 31, likewise employing 25 pounds of spice 32 from the supply 22. Infusion No. 2 is likewise conducted for one hour at 180° F. with agitation and then the infusion mass No. 2 indicated by the numeral 33 is conducted to the same filter 25, and filtered therethrough and through the filter cake 27. Thus there is provided a top layer of filter cake indicated by the numeral 35 and a filtrate or extract No. 2 indicated by the numeral 36. The first filtrate 26 approximates 75 to 85 pounds from the original usage of 100 pounds of oil, and filtrate 36 approximates 50 to 60 pounds. The remaining liquid is retained as a wetting liquid in the combined filter cakes in the filter 25 and is subject to being washed therefrom.

The washing is illustrated by use of oleaginous solvent in the form of 150 pounds of edible hydrogenated oil indicated at 40, heated to 220° F. This is used 20 pounds at a time to wash the filter cake 27—35, each time drawing off the washing by vacuum. The increments of washing solvent used are designated by the lines 41, and the resulting increments of filtrate by the lines 42, all combined at 43 as approximately 150 pounds. The washings 43 and the extract 36 may be combined in varying proportions. When the amounts indicated and mentioned are combined, the resulting spice extract 45 is of course weaker in essential oil but stronger in other spice ingredients than the original essential oil 20, and it is more stable because of its content of native antioxidant. In use 1.5 parts of the combination 45 may substitute for 1 part of essential oil 20.

Modifications are indicated by reference to Fig. 2. After infusion No. 1 the extract No. 1 (26) may be diverted as a new spice material. Also its residue 27 may be washed directly as described and then the washings may be in part or all combined with part or all of the extract 26. In this case the original 100 pounds of essential oil will be enriched with the extracted content of but 25 pounds of the natural spice.

Also, two (or more) successive infusions of the 25-pound batches of natural spice may be made each with 100 pounds of essential oil, and their filter cakes combined or stacked as shown for joint washing as described. These and other variations are contemplated.

In commerce, essential oils have a non-volatile content in general (bay is an exception) running below 1%, and these may be formed by oxidation or polymerization after isolating the essential oil by steam distillation. The following table shows for several spices the non-volatile content in percent by weight, of essential oil 20 in Fig. 2, and of the infused oil 36 of Fig. 2, when processed as described in connection with Fig. 2. Color of the infused oil 26 is also indicated.

| Spice | Non-Volatile Extract, in Per cent | | Color of Infused Oil |
|---|---|---|---|
| | Essential Oil | Infused Oil | |
| Thyme | 0.2 | 3.4 | Deep green. |
| Bay | 2.7 | 4.5 | Do. |
| Sage | 0.15 | 4.8 | Do. |
| Dill | 0.80 | 3.7 | Do. |
| Marjoram | 0.55 | 2.8 | Do. |
| Clove | 0.74 | 2.4 | Dark Brown.[1] |

[1] When .5 to 1 part of sodium carbonate or sodium bicarbonate is present in 100 parts of clove or allspice during the infusion the brown color is deepened.

It is to be understood that the process is not limited to the conditions or the materials specifically mentioned. The temperature is not critical, but it is preferred to practice the infusion at below the boiling temperature to avoid steam or sputtering from moisture in the material. For example, clove with 1% of sodium bicarbonate is readily infused as described at 210° F., giving a deep brown infused oil.

In general the infused oil is richer in spice character and in use bears the color indications imparted by using the natural spice itself.

We claim:

1. The method of fortifying an essential oil of spice, which comprises extracting comminuted spice of the kind corresponding to said essential and extract from the spice soluble materials therein including non-volatile oils, oleoresins and coloring matter.

2. The method of fortifying an essential oil of spice, which comprises extracting comminuted spice of the kind corresponding to said essential oil with said essential oil, whereby to dissolve and extract from the spice soluble materials therein including non-volatile oils, oleoresins and coloring matter, separating the extract and the solid residue, washing the residue with liquid solvent miscible with the extract, and combining at least a portion of the extract and at least a portion of the washings.

3. The method of fortifying an essential oil of spice, which comprises extracting comminuted spice of the kind corresponding to said essential oil with said essential oil, whereby to dissolve and extract from the spice soluble materials therein including non-volatile oils, oleoresins and coloring matter, separating the extract and the solid residue, washing the residue with liquid oleaginous solvent, and combining at least a portion of the extract and at least a portion of the washings.

4. The method of fortifying an essential oil of spice, which comprises extracting comminuted spice of the kind corresponding to said essential oil with said essential oil, whereby to dissolve and extract from the spice soluble materials therein including non-volatile oils, oleoresins and coloring matter, separating the extract and the solid residue, washing the residue with liquid oleaginous solvent, and combining all the extract and all the washings.

5. The method of fortifying an essential oil of spice, which comprises extracting from 25 to 50 parts by weight of comminuted spice of the kind corresponding to said essential oil with about 100 parts of said essential oil, whereby to dissolve and extract from the spice soluble materials therein including non-volatile oils, oleoresins and coloring matter, 6. The method of fortifying an essential oil of spice, which comprises extracting from 25 to 50 parts by weight of comminuated spice of the kind corresponding to said essential oil with about 100 parts of said essential oil, whereby to dissolve and extract from the spice soluble materials therein including non-volatile oils, oleoresins and coloring matter, separating the extract and the solid residue, washing the residue with liquid oleaginous solvent, and combining at least a portion of the extract and at least a portion of the washings.

7. The method of fortifying an essential oil of spice, which comprises extracting from 25 to 50 parts by weight of comminuated spice of the kind corresponding to said essential oil with about 100 parts of said essential oil, whereby to dissolve and extract from the spice soluble materials therein including non-volatile oils, oleoresins and coloring matter, separating the extract and the solid residue, washing the residue with liquid oleaginous solvent, and combining all the extract and all the washings.

8. A spice extract comprising in combination essential oil of a spice and non-volatile ingredients of the same natural spice dissolved in and from said natural spice by said essential oil.

9. An extract of spice containing as solvent essential oil of spice, and as solute the non-volatile ingredients of the same kind of natural spice which are sluble in said solvent.

LLOYD A. HALL.
LOUIS SAIR.

REFERENCES CITED

The following references are of record in the file of this patent:

UNITED STATES PATENTS

| Number | Name | Date |
|---|---|---|
| 1,971,910 | Griffith | Aug. 28, 1934 |
| 2,347,322 | Jackson | Apr. 25, 1944 |
| 2,384,532 | Bush et al. | Sept. 11, 1945 |

Certificate of Correction

Patent No. 2,571,867 October 16, 1951

LLOYD A. HALL ET AL.

It is hereby certified that error appears in the printed specification of the above numbered patent requiring correction as follows:

Column 4, line 29, for "infusions of" read *infusions on*; line 75, after "essential" insert *oil with said essential oil, whereby to dissolve*; column 6, line 3, for "comminuated" read *comminuted*; line 31, for "sluble" read *soluble*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*